United States Patent [19]
Pedersen

[11] Patent Number: 5,711,270
[45] Date of Patent: Jan. 27, 1998

[54] METHOD OF CONTROLLING THE FUEL SUPPLY TO A DIESEL ENGINE WHICH BY HIGH-PRESSURE INJECTION MAY BE SUPPLIED WITH BOTH FUEL OIL AND FUEL GAS, AND A HIGH-PRESSURE GAS INJECTION ENGINE OF THE DIESEL TYPE

[75] Inventor: Peter Sunn Pedersen, Havdrup, Denmark

[73] Assignee: Man B&W Diesel A/S, Copenhagen SV, Denmark

[21] Appl. No.: 780,583

[22] Filed: Jan. 8, 1997

[30] Foreign Application Priority Data

Jan. 15, 1996 [DK] Denmark .................. 0035/96

[51] Int. Cl.$^6$ .................................................. F02M 43/00
[52] U.S. Cl. ................................................... 123/304
[58] Field of Search ........................... 123/304, 299, 123/525

[56] References Cited

U.S. PATENT DOCUMENTS

| | | | |
|---|---|---|---|
| 4,699,103 | 10/1987 | Tsukahara et al. | 123/304 |
| 4,700,672 | 10/1987 | Baguena | 123/299 |
| 4,924,828 | 5/1990 | Oppenheim | 123/299 |
| 5,140,959 | 8/1992 | Durbin | 123/304 |
| 5,315,973 | 5/1994 | Hill et al. | 123/304 |
| 5,365,902 | 11/1994 | Hsu | 123/299 |
| 5,479,906 | 1/1996 | Collie | 123/525 |
| 5,546,902 | 8/1996 | Paluch et al. | 133/304 |

FOREIGN PATENT DOCUMENTS

| | | | |
|---|---|---|---|
| 154448 B | 11/1988 | Denmark | 123/304 |
| 0 520 659 B1 | 12/1992 | European Pat. Off. | 123/304 |
| 0 546 985 A1 | 6/1993 | European Pat. Off. | 123/304 |
| WO 82/03891 | 11/1982 | WIPO | 123/304 |
| WO 95/24551 | 11/1995 | WIPO | 123/304 |

*Primary Examiner*—Raymond A. Nelli
*Attorney, Agent, or Firm*—Sughrue, Mion, Zinn, Macpeak & Seas, PLLC

[57] ABSTRACT

A diesel engine can by high-pressure injection be supplied with both fuel oil and fuel gas. Each combustion in the cylinders of the engine is initiated by injection of fuel oil, and gas can be injected after initiation of the combustion. The gas share of the total fuel amount per combustion is adjustable, and the gas injection is prevented by a safety device in case of failing injection of fuel oil. When the share of gas of the total amount of fuel at a certain engine load is changed, the starting time for injection of fuel gas in relation to the starting time for injection of fuel oil is varied so that the gas injection is delayed when the gas share of the total amount of fuel is smaller, and vice versa.

11 Claims, 4 Drawing Sheets

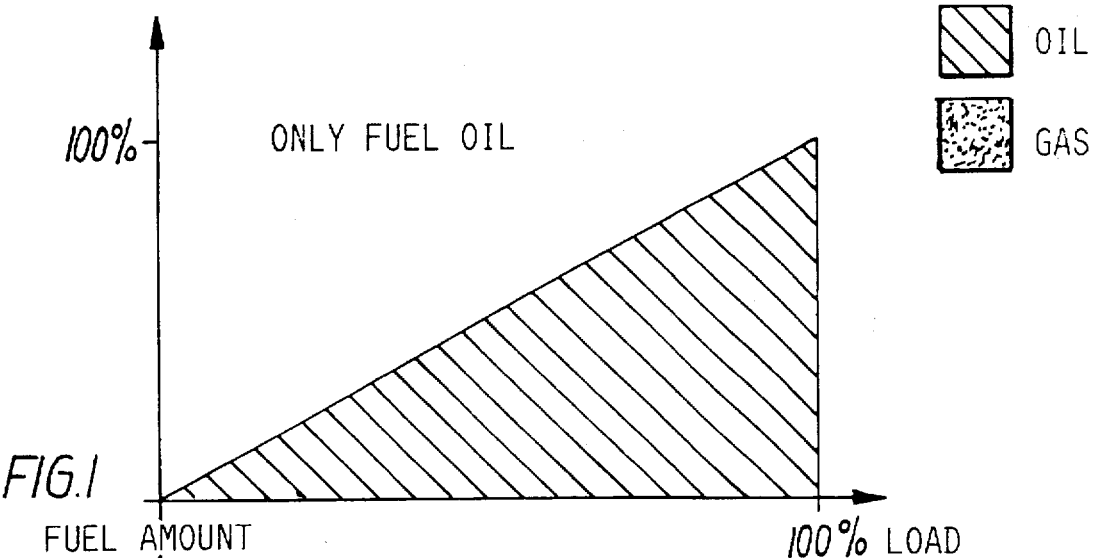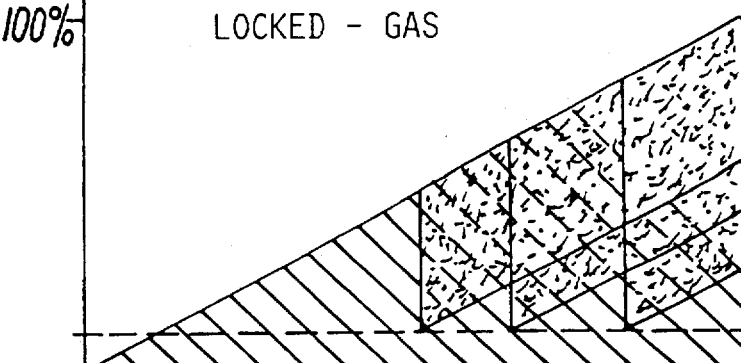

METHOD OF CONTROLLING THE FUEL SUPPLY TO A DIESEL ENGINE WHICH BY HIGH-PRESSURE INJECTION MAY BE SUPPLIED WITH BOTH FUEL OIL AND FUEL GAS, AND A HIGH-PRESSURE GAS INJECTION ENGINE OF THE DIESEL TYPE

CROSS-REFERENCE TO RELATED APPLICATIONS

The present application claims the benefit of priority from Danish patent application No. 0035/96 filed on 15 Jan. 1996.

BACKGROUND OF THE INVENTION

The present invention relates to a method of controlling the fuel supply to a diesel engine which by high-pressure injection may be supplied with both fuel oil and fuel gas, in which method each combustion in the cylinders of the engine is initiated by injection of fuel oil, and gas can be injected after initiation of the combustion, the gas share of the total fuel amount per combustion being adjustable, and the gas injection being prevented by a safety device in case of failing injection of fuel oil.

Such a method is known from the technical article "Development of the World's First Large-Bore Gas-Injection Engine" by T. Fukuda, P. Sunn Pedersen et al, paper D51, CIMAC 1995 in Interlaken, CH. The article mentions that the camshaft-driven fuel oil pumps and oil injection valves cannot inject more oil than an amount which in the oil-only mode of operation corresponds to an engine load of 30 percent of full load. It also mentions that in case of a desire for oil-only operation at full load, standard size pumps and valves can be mounted as known from purely oil-driven diesel engines.

In the gas engines of the diesel type the oil injection is used to ensure combustion at the desired time of the engine cycle of the injected gas, which is less ignitable than the oil. It is crucial to the safety in the gas engine system that the gas is combusted in the cylinder and does not explode in the exhaust system, and a precise, predetermined time of ignition of the fuel is important to operational economy and engine control. Therefore, in prior-art engines as an aid to ignition of the gas a certain amount of fuel oil, typically corresponding to about 8 percent of the fuel oil amount at oil-only operation at full engine load, is injected.

DK-B 154448 describes a gas engine with a safety device to prevent gas injection in an engine cycle where the fuel oil injection has failed. If this engine is designed with a variable ignition timing (VIT) by a variable setting of the starting time for the effective pump stroke of the fuel oil pump, the patent teaches that the opening of the gas valve must take place at an unchanged distance in time to the opening of the fuel oil valve.

In the gas engine known from EP-B1 520659 it is mentioned concerning the oil-only mode of operation that this mode of operation can occur at low engine loads, for example at starting and stopping of the engine.

EP-A1 546985 describes for the fuel valve that at the start of the gas injection a brief injection of a small amount of diesel oil may also take place, corresponding to about 5 percent of the oil-only consumption at full load. The engine with this valve can be operated either in a gas mode of operation with injection of said small amount of oil, or in an oil-only mode of operation without gas injection.

It has been proposed that a high-pressure gas injection engine of the diesel type should optionally and depending on external circumstances be able to be driven in one of three operating modes, viz., oil-only operation up to full load (fuel-oil-only mode), dual-fuel mode where oil-only operation is used up to a predetermined low load, and above this load the engine is operated with the minimum fuel oil amount required for ignition aid and adjustment of the output to the load on the engine by variation of the gas amount, and locked-gas mode where the engine is operated in oil-only mode of operation up to a certain load determined by the chosen gas amount, and above this load with a fixed amount of gas which is adjustable according to the amount of gas available, but is independent of the engine load, and adjustment of the output to the engine load by variation of the amount of oil.

BRIEF SUMMARY OF THE INVENTION

Stationary, power-producing engine plants with gas engines of the above type may face the problem that the line gas pressure drops for a period so that the gas compressor does not have sufficient time to high-pressure compress sufficient amounts of gas to cover the requirement of the engine, and in that case it will be necessary to reduce the engine load in accordance with the available amount of fuel.

Gas tankers may also exhibit variations in the energy content of the amount of gas available to a gas propulsion engine. For example in LNG carriers (Liquefied Natural Gas) the gas boil-off in the tanks will be lower immediately after loading, when the tanks are subcooled, and the calorific value of the evaporated gas will also be smaller owing to a higher content of nitrogen in the gas. It is also obvious that the gas boil-off is greater when the carrier sails under tropical conditions than under temperate or arctic conditions.

It is a purpose of the invention to be able to maintain full engine load although the gas supply is reduced or fails.

It is another purpose of the invention to maintain high degrees of efficiency of the engine and the highest possible engine output.

The method according to the invention is so that when the share of the gas of the total amount of fuel at a certain engine load is changed, the starting time for injection of fuel gas is varied in relation to the starting time for injection of fuel oil so that the gas injection is delayed when the gas share of the total amount of fuel is smaller, and vice versa.

The result of the delayed gas injection at lower gas shares is that a larger amount of fuel oil has been combusted at the time when the gas is ignited and contributes to the heat development and thus also to the pressure increase in the cylinder. The total combustion in the cylinder produces a more even progression in the pressure increase with a controlled maximum pressure in the cylinder corresponding to the design pressure of the engine, which contributes to the achievement of good efficiency and does not strain the engine elements too much.

The gas engine may suitably be controlled so that the starting time for injection of fuel gas is changed so that the beginning opening of the gas injection valve normally only varies within a crankshaft rotational angle of 6° in relation to the beginning closure of the oil injection valve, when the engine at sustained, preferably full, engine load is switched between 100 percent oil operation and maximum gas operation. At maximum gas operation, only the amount of oil required as an aid to ignition is injected, and the oil may be combusted already after a crankshaft rotation of a few degrees. Therefore, the gas must be injected as soon as possible after the safety device detects the oil injection, which means in practice that the gas valve starts opening immediately before the beginning closure of the oil valve. If the gas share is smaller and the oil is injected during a crankshaft rotation of, for example, 8°, the combustion of the oil will continue yet a little while, and the temperature level in the cylinder will be so high that the opening movement of the gas valve can be initiated 1°–3° after a beginning closure of the oil valve, if it is desired to spread the heat development over a larger interval of rotation so as to control the combustion pressure. It is also possible to advance the heat development during the time when the delivery pressure from the oil pump is decreasing, as the opening movement of the gas valve can be initiated up to 3° before the beginning closure of the oil valve. Whether and to what degree this is suitable depends on the current design of the fuel pumps and valves.

In a further development of the method which is especially simple as concerns control, the beginning opening of the gas injection valve is offset in step with the beginning closure of the oil injection valve when the gas share is varied. The synchronous offsetting of the closure and opening of the valves renders possible a simple coupling of mechanical or other control-engineering type between the controls of the closure of the oil valve and the opening of the gas valve.

The invention also relates to a high-pressure gas injection engine of the diesel type with an injection system for fuel oil and fuel gas comprising a fuel oil source actuated at each combustion in the associated cylinder and capable of supplying the oil for at least one fuel oil injection valve at a pressure which exceeds the opening pressure of the latter, and a high-pressure gas source connected with at least one fuel gas injection valve, the opening and closure of which is controlled by control oil, and at least one safety device which at each combustion only permits the control oil to open the gas injection valve if the fuel oil pressure at the combustion in question has exceeded said opening pressure, the engine having at least one governor which controls the injected amounts of oil and gas and can vary the gas share of the total amount of fuel per combustion. For each cylinder in this gas engine the injection system comprises an electronically actuated control valve which is connected with a drain and with a control oil high-pressure source and with a supply pipe for control oil of the gas injection valve, and an electronic control unit provides actuation signals for the opening by the control valve of the gas injection valve at angular positions of the crankshaft which depend on the size of the gas share of the total amount of fuel so that at a smaller gas share gas injection takes place later in the engine cycle.

In addition to said advantages of being able to control the timing of initiation of the gas injection in dependency of the gas share by means of the electronically actuated control valve and the electronic control unit, these two electronic components in the gas injection system provide the further advantage that the engine can be supplied as a heavy-oil-only combusting diesel engine which can later easily be converted into a gas-driven engine according to the invention. At the conversion, the fuel system can be supplemented with the gas components without any changes having to be made to the camshaft system. It is also possible to install the gas system subsequently on an existing engine. As only one camshaft-driven oil pump per cylinder is needed, a conventional camshaft provides sufficient space for the oil pumps to be manufactured in a size that permits the engine to be run at a 100 percent load in the fuel-only mode if no gas consumption is wanted or if the gas system has temporarily been taken out of operation.

When only a minimum amount of fuel oil is to be injected to aid ignition, and the gas injection is to begin as quickly as possible after an ascertained fuel oil pressure, the engine may in one embodiment be designed so that the control unit actuates the control valve to apply control oil pressure on the supply pipe of the gas injection valve before this valve is to be actuated for gas injection, and so that the safety device drains away or shuts off the control oil pressure until it detects the required fuel oil pressure and ends the draining away or the shut-off. In this embodiment, rather slow-acting electronically actuated control valves, such as conventional magnet valves or solenoid-controlled valves may be used to connect the control oil high-pressure source with said supply pipe, the quick-acting actuation of the gas injection being carried out by the safety device. At higher engine loads, when the gas share is not so high and the gas is to be injected later, the control unit can actuate the gas injection by means of the electronic control valve. In this case the oil injection continues for an appropriate period after the safety device has enabled the gas injection so that there is suitable time to switch the electronic control valve.

In a preferred embodiment the electronically actuated control valve is quick-acting with a switch time of maximum 2 ms, preferably maximum 1 ms. The short switch time permits the control unit to use the electronic control valve for actuation of the gas injection at all operating conditions. The quick-acting control valve has the effect essential to engine safety that actuation of the gas injection always depends on the setting of two different components, viz., the actively functioning control valve and the safety device. This is especially important in the dual-fuel mode of operation at full engine load where the amount of oil is minimum and the amount of gas maximum per injection. The short switch time of maximum 1 ms also makes more time available for signal collection and calculation in the electronic control unit.

In a gas carrier it is known that at least one sensor records the pressure in the gas tanks and the pressure changes therein. In one embodiment, the engine is the propulsion engine of such a ship, and the governor of the engine is adapted, on the basis of the tank pressures measured, to control the gas share of the fuel amount so that the gas consumption of the engine keeps the tank pressure within a predetermined pressure interval. This embodiment is especially suitable for LNG carriers in which the gas is kept liquid by means of cooling from the gas evaporation, not by pressurization. The gas tanks are not pressure containers proper, but are insulated tanks with gas where the boil-off gas must be removed to prevent excessive pressure increases in the tanks. In the prior-art LNG carriers, the boil-off gas is combusted in boilers for steam production for turbines. By using a high-pressure gas injection engine of the diesel type as the propulsion engine according to the invention, the superior fuel utilization of this engine as compared with turbines may partially compensate for the fact that better tank insulation in the LNG carriers would reduce the amount of boil-off gas from about 0.25 percent to about 0.1 percent of the tank content per day. According to the invention, the governor adapts the gas consumption of the engine to the amount of boil-off gas, i.e., the gas consumption is adjusted in consideration of the gas tanks of the ship. If the engine is not capable of using sufficient gas, excess gas may be combusted in a boiler.

Preferably the governor supplies more fuel oil to the engine if the amount and/or the calorific value of the boil-of gas from the gas tanks is insufficient to cover the fuel gas requirement of the engine. This embodiment is distinguished in that the operation of the ship has automatically been made independent of the gas boil-off from the tanks.

In a further embodiment, which renders possible gas engines without a camshaft, among other things, the electronic control unit also provides actuation signals to an electronically actuated second control valve which is connected with a drain and with the fuel oil high-pressure source as well as with the fuel supply on the oil injection valve and can switch the fuel supply between connection to the drain and the high-pressure source. The fuel oil high-pressure source may be a high-pressure tank pressurized by a pump, which supplies the engine cylinders with fuel oil at an approximately even delivery pressure. Having the control unit control both the oil and the gas injection by means of electronically actuated control valves provides the freedom not only to adjust the size of the gas share per combustion, but also at the same time to vary the setting of the injection timing for the combustion as a whole without having to use very complex mechanical control systems. It is obvious that in this embodiment the governor can easily be an integral part of the electronic control unit, such as a control circuit thereof.

BRIEF DESCRIPTION OF THE SEVERAL VIEWS OF THE DRAWING

Examples of the invention will now be explained below with reference to the very schematical drawings, in which FIGS. 1–3 show diagrams of three different examples of control modes for the fuel supply.

DETAILED DESCRIPTION OF THE INVENTION

Figure 4:
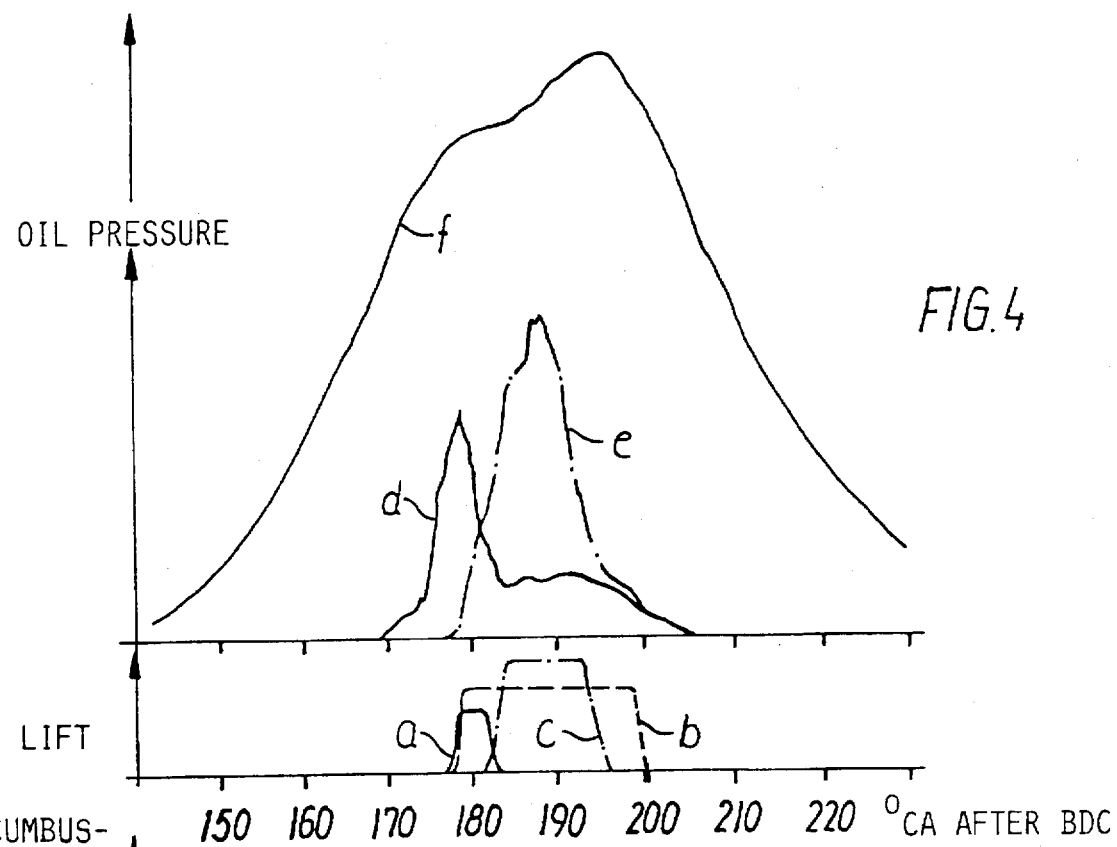
FIGS. 4 and 5 are diagrams to illustrate the valve actuations according to the invention during a combustion, shown for the same engine load at a large and a small gas share.

High-pressure gas injection engines of the diesel type may be four-stroke engines of the medium speed type or large two-stroke crosshead engines which, with the present engines of the applicant's type MC-GI, may have an output per cylinder ranging from 250 to 5710 kW at rotational speeds ranging from 75 to 250 rpm at stroke:bore ratios ranging from 2.45 to 4.20.

The three control modes for fuel supply to the engine mentioned in the introduction, fuel oil-only, dual-fuel and locked-gas modes, are shown in FIGS. 1–3. These control modes are distinguished in being simple to control with a mechanically acting governor for adjusting the supply of oil and gas, the control modes being based on the locking of one of the supplies at a fixed value in a predetermined interval for the engine load. At a very low load during starting and stopping, the gas supply is locked at zero in all three modes. In FIG. 1 the interruption of the gas supply is maintained over the whole load interval. It applies to all operating modes that a certain minimum amount of oil is injected, for example 5 percent or 8 percent of the maximum amount of oil at a 100 percent load. In the dual-fuel mode in FIG. 2, at a predetermined load of for example 40 percent, a change is made to lock the amount of oil at said minimum amount, while the gas supply is given free. In FIG. 3, the supply of gas has been locked at a certain adjustable amount of gas which depends on the desired gas consumption. The areas marked in the figure with both gas and oil mean that here either gas or oil may be used for operation, depending on the set amount of gas. Other control modes than those shown in the drawing are possible, particularly if the governor is part of an electronic control unit which can make gradual changes in the adjustments of the supply without complex mechanical systems.

The amounts and fuel shares mentioned relate to a single combustion sequence in a cylinder, and the amounts are expressed in percent, viz., dimensioned with the consumption of the cylinder in question at 100 percent load. In general, the indications of amounts are to be understood as amounts of energy, as pure fuel gas may have a calorific value per kg which may be, for example, 10 percent higher than that of fuel oil.

Figure 5:
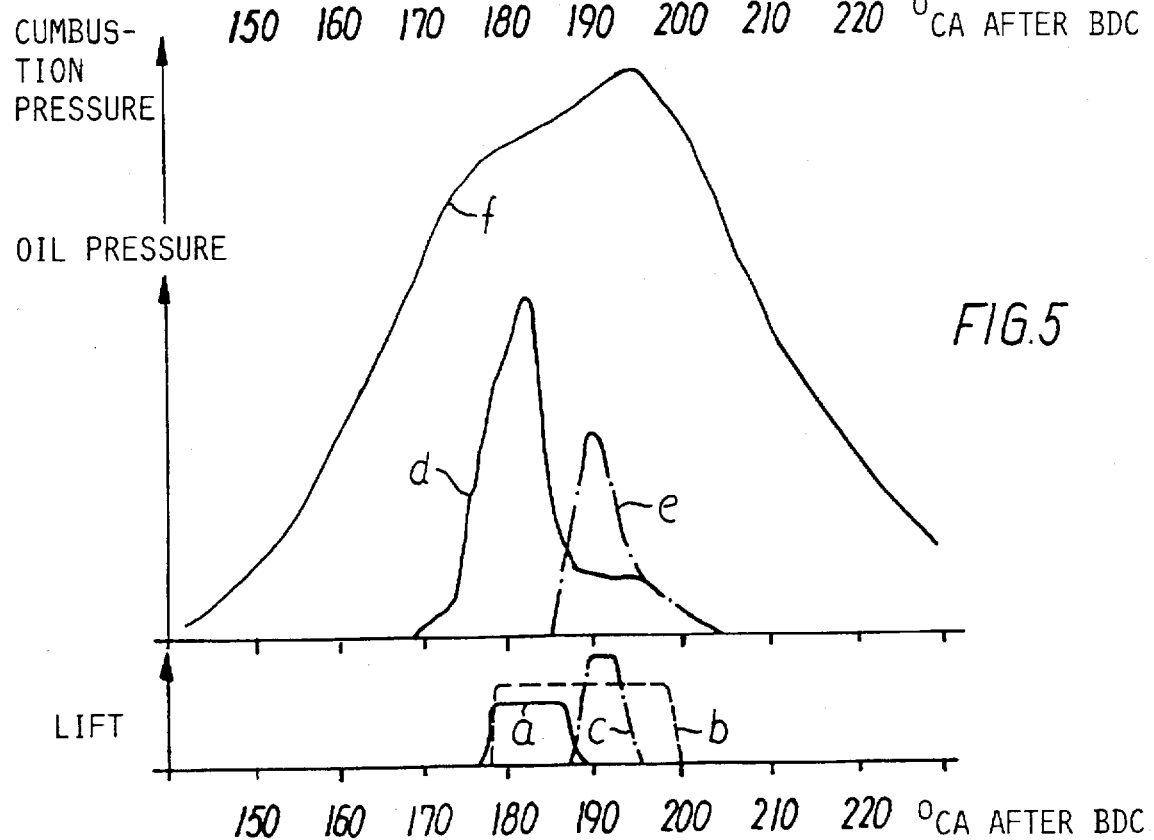

An example of the control of the gas injection by means of the method according to the invention is shown in FIGS. 4 and 5. The bottom part of the diagrams shows the lift curves for the valve sliders, the solid-line curve a indicating the fuel oil valve, the intermittent-line curve b a safety device formed as a drain valve, and the dot-and dash curve c the gas valve. In the upper part the solid-line curve d illustrates the fuel oil pressure, the intermittent-line curve e is the control oil pressure and the upper solid-line curve f the pressure in the combustion chamber. Both the figures show that the combustion is initiated by the fuel oil pressure d rising above the opening pressure of the oil injection valve so that it opens (curve a). As soon as this opening pressure is reached, the safety device is actuated as shown by curve b to enable gas injection. It can be seen in FIG. 4 that the control oil pressure e starts rising steeply as soon as the safety device is actuated, and a little later the gas injection (curve c) is enabled at the early time which is optimum at the highest gas share (dual-fuel mode). In FIG. 5 the fuel oil pressure is maintained over a larger crank angle interval, which provides a larger amount of injected oil and thus requires a smaller gas share. It can be seen that the build-up of the control oil pressure and thus also the opening of the gas valve are delayed and occur approximately 7° later in the engine cycle. The gas injection may suitably be delayed so much that the course of the heat development in the cylinder substantially corresponds to that of the heat development produced in the oil-only mode of operation at corresponding engine loads.

Figure 6:
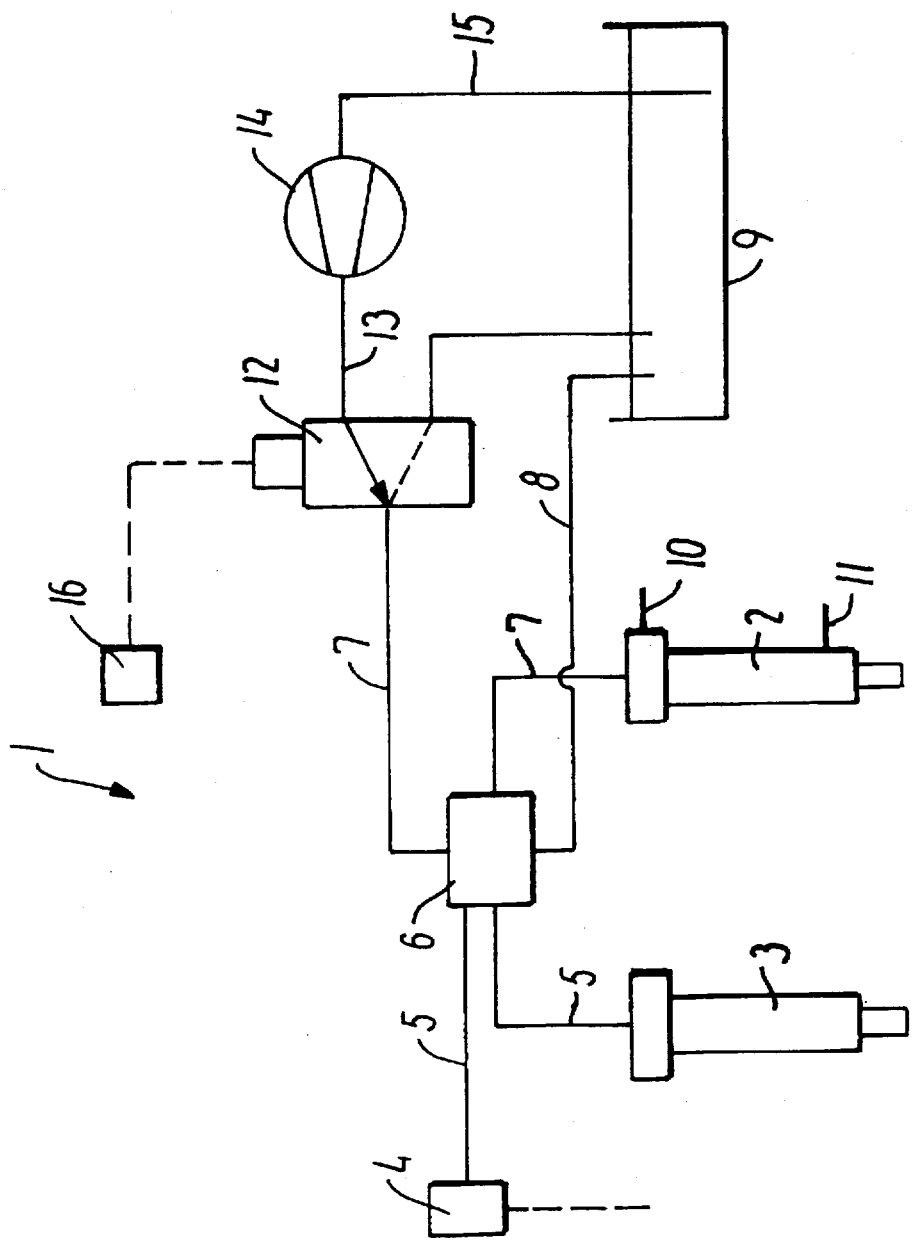
FIG. 6 is a simplified example of an embodiment of the fuel system in the engine according to the invention.

The fuel system 1 in FIG. 6 comprises a gas injection valve 2 and an oil injection valve 3. The two valves may be mounted separately in respective injectors in the associated cylinder cover or may be co-built in a combined fuel injector into a so-called dual-fuel injector. Several injection valves of each type may be mounted on the same cylinder to achieve a better distribution of the fuel in the cylinder, among other things.

The fuel oil is supplied in periods with the desired timing in the engine cycle to the oil valve 3 of the cylinder from a fuel oil source 4, which may have different designs. The fuel oil source may be a conventional fuel pump supplied with oil from a low-pressure supply pipe common to the pumps and having a pump piston driven by a cam on a camshaft. In the usual manner, a governor, not shown, can turn the pump piston for adjustment of the amount of oil delivered by the pump at a high pressure of up to, for example, 800 bar. Alternatively, the fuel oil source may be an electronically actuated fuel pump supplied with oil from a common low-pressure supply pipe and adjusted as regards amount and controlled as to time by means of setting signals from an electronic control unit. Another possibility is that the fuel oil source includes a high-pressure reservoir for oil connected to a supply port of an electronically actuated control valve which has further minimum two ports, viz., a discharge port for a pipe 5 leading to the oil inlet of the valve 3, and a port connected with a drain. Based on control signals received from an electronic control unit, the control valve can connect the pipe 5 to either the oil inlet port or the drain port.

When, at the point in the engine cycle desired in consideration of the timing of the combustion, the fuel oil source 4 starts delivery of high-pressure oil to the pipe 5, the pressure will rapidly rise above the opening pressure of the oil valve 3, whereupon the oil is injected. At the same time the oil pressure actuates a safety device 6 to enable the application of control oil pressure on the gas valve 2. The safety device 6 may be of a well-known mechanical type with a piston keeping a drain port in a control oil pipe 7 open until the fuel oil pressure displaces the piston so as to close the drain port when said opening pressure is exceeded. Through a pipe 8 the drain port is connected to a reservoir 9 for control oil. Alternatively, the safety device may be of an electronic type which determines in an electronic control unit whether the fuel oil is injected and uses this information as a condition for actuation of the gas valve 2. In this case the control unit can detect the oil injection on the basis of a pressure sensor in the pipe 5 or a position sensor in the valve 3 for detection of the actual valve opening.

In the embodiment shown the gas valve 2 may be actuated to an open position by the application of control oil pressure at the connection of the gas valve to the pipe 7. The valve 2 further has a connection 10 for sealing oil and a connection 11 leading to a high-pressure gas accumulator. The sealing oil pressure may, for example, be 40 bar higher than the gas pressure in the connection 11. Alternatively, the gas valve may be kept closed by the control oil pressure and be opened by removal thereof, whereby the need for sealing oil lapses. This has been described in further detail in WO95/24551.

An electronically actuated control valve 12 has an inlet port connected to a pipe 13 with high-pressure oil delivered from a pump 14 which is fed from the reservoir 9 via a pipe 15. The control valve 12 further has at least two ports, viz., a discharge port to the pipe 7 for the gas valve 2 and a drain port connected with the reservoir 9. Based on control signals received from an electronic control unit 16, the control valve can connect the pipe 7 to either the oil pressure pipe 13 or the drain port. The control valve may, for example, be a magnet valve, an electronically controlled hydraulic valve or a magnet valve with so-called magnetic latching, which may provide extremely short switch times.

The electronic control unit 16 is provided with information in a well-known manner about the current angular position of the crankshaft of the engine. If the fuel oil source is controlled by a mechanically acting governor, a sensor detects the setting of the governor applying to injection of oil and transmits signals to this effect to the control unit 16. If the governor is electronic and possibly integral with the control unit 16, the actuation signals for the fuel oil source are already available in electronic form. The control unit may further contain data for the switch time for the control valve 12 and for the period required from actuation of the control valve until the pressure change in the pipe 7 results in opening of the gas valve 2 so that the control unit can compensate for these delays. On the basis of the information on the current oil injection, the control unit 16 can actuate the control valve 12 at exactly the time that commences gas injection at the desired time in relation to the end of the oil injection.

Figure 7:
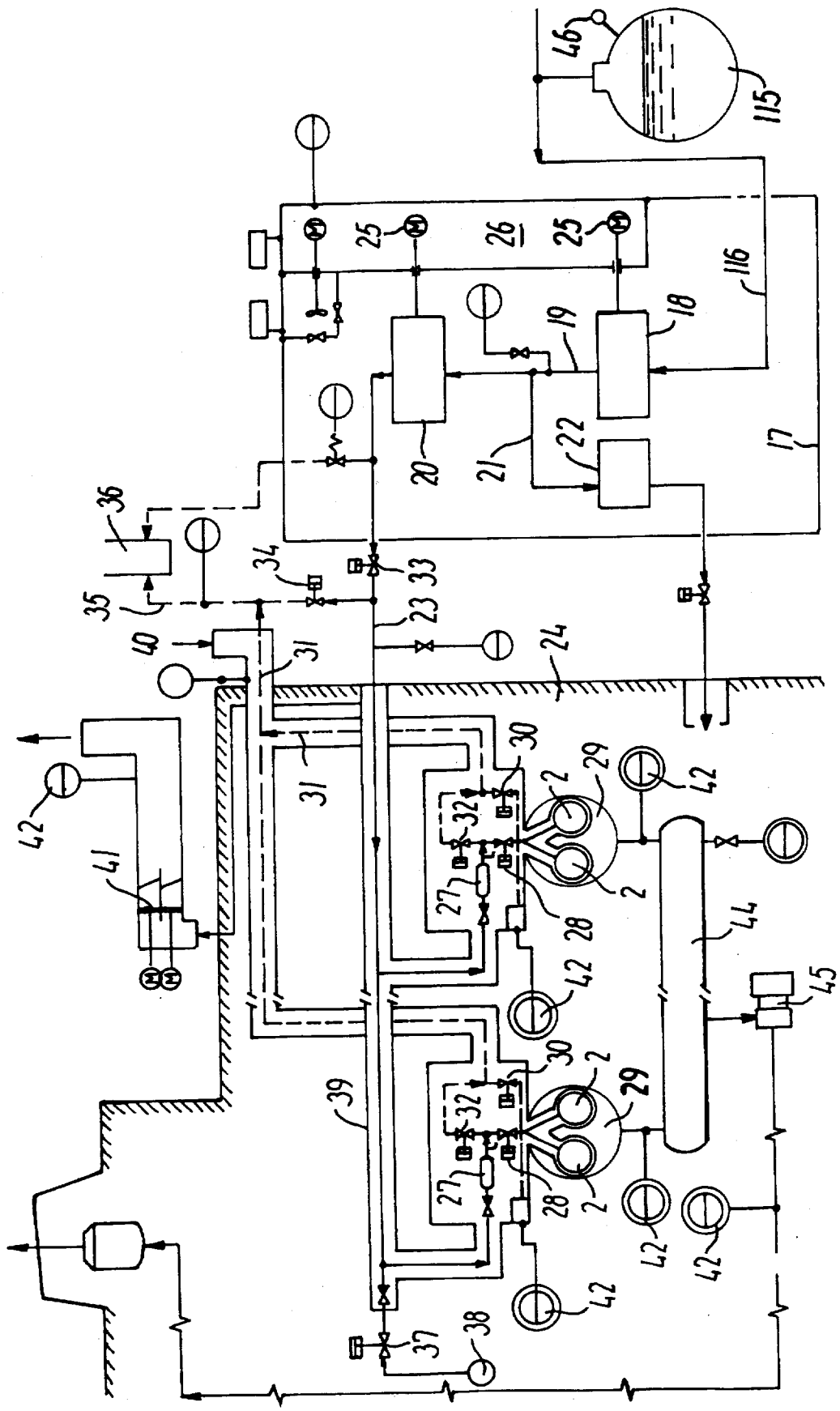
FIG. 7 is the gas system of a propulsion engine in an LNG carrier shown in more detail.

An example of the gas system in an LNG carrier with a propulsion engine according to the invention will now be described below with reference to FIG. 7. Via a pipe 116 from gas tanks 115 the boil-off gas can be passed into a gas treatment room 17 which is completely separated from the engine room of the ship. A low-pressure compressor 18 compresses the gas to about 25 bar and through a pipe 19 is connected to both a high-pressure compressor 20 and a branch pipe 21, through which excess gas can be passed off to a boiler, not shown, after preheating in a unit 22. The high-pressure compressor delivers the gas at a pressure of, for example, 250 bar to a supply pipe 23 which has been passed into the engine room 24. The drive motors 25 for the compressors are arranged in a gas-tight cubicle 26, and both this and the room 17 are ventilated by respective blowers.

In the engine room, the supply pipe 23 is at each engine cylinder connected to a high-pressure gas accumulator 27, the volume of which can accommodate gas for, for example, 20 injection sequences, which renders it possible to measure a limited gas pressure decrease at each injection and to interrupt the gas supply to the gas valve 2 by means of a shut-off valve 28, if the lowering of the pressure reaches more than a predetermined value.

The drawing only shows two cylinders 29, but of course the engine has more. A blow-off valve 30 can empty the gas from the gas system of the cylinder through a drain pipe 31, if necessary. A purge valve 32 can empty the gas accumulator 27 if the engine is not to operate in the gas mode for a period, for example because the ship is sailing in ballast. If the whole supply pipe 23 is to be emptied of gas, a main valve 33 may be closed and a shut-off valve 34 in a drain pipe 35 be opened, and the blow-off valves 30 may also be opened, whereby the gas is passed via drain pipes 31 and 35 to a ventilation unit 36 passing the gas into open air. Then a shut-off valve 37 may open for an inert-gas source 38 which purges the system completely of gas.

The gas-containing elements in the engine room are surrounded by a shielding 39, which is supplied with ventilating air at the discharge of the drain pipe 31 as shown by the arrow 40, at least one blower 41 sucking air out of the shielding 39 at the passage of the supply pipe into the engine room. Gas detectors 42 are arranged at suitable places in the system to monitor any gas leaks. A gas detector 42 may, for example, be mounted in the exhaust pipe 43 of each cylinder to the exhaust receiver 44 and a gas detector in the exhaust pipe of the discharge side of the turbocharger 45.

The gas tank 115 is provided with a pressure sensor 46, and in a control unit, not shown, the pressure changes in the gas tank are recorded over a long period of time so that based on the trends in pressure changes the control unit can notify the governor of the engine about the desired gas consumption maintaining the tank pressure within the prescribed pressure interval. As the tank pressure varies slowly at correct running of the system, the governor of the engine adjusts the gas consumption at relatively long time intervals, such as for each 1000 or 10,000 engine revolutions.

I claim:

1. A method of controlling the fuel supply to a diesel engine which by high-pressure injection can be supplied with both fuel oil and fuel gas, wherein the engine includes cylinders in which combustions occur, each combustion being initiated by injection of fuel oil, and gas can be injected after initiation of the combustion, a total fuel amount being injected per combustion and the gas share thereof being adjustable, and the gas injection being prevented by a safety device in case of failing injection of fuel oil, and wherein a starting time for injection of fuel gas in relation to a starting time for injection of fuel oil is varied so that the gas injection is delayed when the gas share of the total amount of fuel is smaller, and vice versa.

2. A method according to claim 1, wherein the starting time for injection of fuel gas is changed so that the beginning opening of the gas injection valve only varies within a crankshaft rotational angle of 6° in relation to the beginning closure of the oil injection valve, when the engine at a fixed load is switched between 100 percent oil operation and maximum gas operation.

3. A method according to claim 1, wherein the beginning opening of the gas injection valve is offset in step with the beginning closure of the oil injection valve when the gas share is varied.

4. A high-pressure gas injection engine of the diesel type with an injection system for fuel oil and fuel gas; wherein the injection system has a fuel oil source actuated at each combustion in an engine cylinder and capable of supplying the oil for at least one fuel oil injection valve at a pressure which exceeds an opening pressure of said fuel oil injection valve, a high-pressure gas source connected with at least one fuel gas injection valve, the opening and closure of which is controlled by control oil, at least one safety device which at each combustion only permits the control oil to open the gas injection valve if the fuel oil pressure at the combustion in question has exceeded said opening pressure, and for each cylinder an electronically actuated control valve which is connected with a drain and with a control oil high-pressure source and with a supply pipe for control oil to the gas injection valve;

wherein the engine has at least one governor which controls injected amounts of oil and gas and can vary the gas share of a total amount of fuel per combustion;

and wherein an electronic control unit provides actuation signals for the opening by the control valve of the gas injection valve at angular positions of the crankshaft which depend on the size of the gas share of the total amount of fuel so that at a smaller gas share, gas injection takes place later in the engine cycle.

5. A high-pressure gas injection engine according to claim 4, wherein the control unit actuates the control valve to apply control oil pressure on the supply pipe of the gas injection valve before this valve is to be actuated for gas injection, and the safety device drains away the control oil pressure until it detects the required fuel oil pressure and ends the draining away.

6. A high-pressure gas injection engine according to claim 4, wherein the control unit actuates the control valve to apply control oil pressure on the supply pipe of the gas injection valve before this valve is to be actuated for gas injection, and the safety device shuts off the control oil pressure until it detects the required fuel oil pressure and ends the shut-off.

7. A high-pressure gas injection engine according to claim 4, wherein the electronically actuated control valve is quick-acting with a switch time of maximum 2 ms, preferably maximum 1 ms.

8. A high-pressure gas injection engine according to claim 4, wherein the engine is a propulsion engine of a gas carrier having gas tanks in which at least one sensor records a tank pressure and pressure changes therein, and wherein said governor of the engine is adapted, on the basis of the tank pressures measured, to control the gas share of the fuel amount so that a resulting gas consumption of the engine keeps the tank pressure within a predetermined pressure interval.

9. A high-pressure gas injection engine according to claim 8, wherein the governor supplies more fuel oil to the engine if the amount of the boil-off gas from the gas tanks is insufficient to cover the fuel gas requirement of the engine.

10. A high-pressure gas injection engine according to claim 8, wherein the governor supplies more fuel oil to the engine if the calorific value of the boil-off gas from the gas tanks is insufficient to cover the fuel gas requirement of the engine.

11. A high-pressure gas injection engine according to claim 4, wherein the electronic control unit also provides actuation signals to an electronically actuated second control valve which is connected with a drain and with the fuel oil high-pressure source as well as with the fuel supply on the oil injection valve and can switch the fuel supply between connection to the drain and the high pressure source.

* * * * *